United States Patent [19]

Zint

[11] Patent Number: 5,088,751
[45] Date of Patent: Feb. 18, 1992

[54] GARDEN CART

[76] Inventor: Jerry A. Zint, 16 Sherman Ave., Ft. Thomas, Ky. 41075

[21] Appl. No.: 520,099

[22] Filed: May 7, 1990

[51] Int. Cl.⁵ .............................................. B62B 3/10
[52] U.S. Cl. .................... 280/47.34; 280/62; 280/79.5
[58] Field of Search ............... 280/47.34, 47.371, 79.4, 280/62, 79.11, 79.5, 651, 659

[56] References Cited

U.S. PATENT DOCUMENTS

| 294,211 | 2/1886 | Downing | 280/43 |
|---|---|---|---|
| 344,661 | 6/1886 | Buck et al. | 280/47.2 |
| 345,090 | 7/1886 | Walter | 414/456 |
| 808,739 | 1/1906 | Focht | 280/47.19 |
| 909,297 | 2/1909 | Helgeson | 414/450 |
| 2,518,032 | 8/1950 | Lewis | 280/7.17 |
| 4,222,580 | 9/1980 | Krokonko | 280/79.5 |

FOREIGN PATENT DOCUMENTS 0289937 11/1988 European Pat. Off. ........... 280/79.5

Primary Examiner—Andres Kashnikow
Assistant Examiner—Richard Camby
Attorney, Agent, or Firm—Wood, Herron & Evans

[57] ABSTRACT

A lawn or garden cart is disclosed comprising a circular flanged frame providing support and retainment of a separable receptacle such as a bucket or tub, used for the purposes of gardening and lawn care. The cart's simplicity of construction and ease of use allow a user to operate and conveniently store the cart.

11 Claims, 1 Drawing Sheet

GARDEN CART

FIELD OF THE INVENTION

This invention relates to wheeled vehicles, more particularly to a wheeled vehicle adapted for use as a lawn or garden cart.

BACKGROUND OF THE INVENTION AND DESCRIPTION OF PRIOR ART

Many carts, hand trucks and other small wheeled vehicles of that general class have been constructed for various uses. Some are simple in construction and solve a need in their respective fields. For example, U.S. Pat. Nos. 294,211 and 45,090 disclose hand trucks adapted for lifting and transporting stoves, barrels and like articles in stores, households and elsewhere. U.S. Pat. No. 344,661 discloses a warehouse-truck providing an inclined carrying surface for warehouse use. U.S. Pat. No. 808,739 discloses a street sweeper's cart providing suitable means for the reception and the support of receptacles for sweepings, trash, paper and the like. Furthermore, the '739 cart can be tilted upward to allow for transportation from place to place U.S. Pat. Nos. 909,297 and 2,518,032 disclose combination carts, especially general utility carts with various uses.

In the garden or lawn care industry, there is a need for a durable lawn or garden cart that is simple in construction for facilitating convenience in storage and is easy to use for the purposes of gardening and lawn care.

SUMMARY OF THE INVENTION

In a broad aspect of the present invention, a durable lawn or garden cart is provided that is adapted for receiving and transporting a separable receptacle.

In a more specific aspect of the present invention, a three-wheeled durable lawn or garden cart is provided that includes a circular frame for carrying and retaining a receptacle. The three-wheeled circular frame construction offers easy mobility and handling in use; and is conveniently storable. The circular frame is also most universal for garden tubs. The circular frame is comprised of a metal ring for retaining the receptacle. In one form, the metal circular ring has a base and a vertically extending flange upon which the receptacle rests and is retained.

In one embodiment, the frame of the cart has a low base for easy accessibility to the receptacle being retained on the frame. The cart is especially adapted for use with garden tubs or buckets. These containers often readily wear out by use and, therefore, the cart of this invention is essentially reusable with substitute tubs or buckets. The easy access allows for less difficulty in placing articles or objects in the receptacle when a user is in the kneeling position.

In another embodiment in accordance with the features of the present invention, a forward extension of the circular frame provides a pivot point for a front pivoting wheel of the three-wheeled cart. Because of the pivot point on the forward extension, the front pivoting wheel is able to rotate about a vertical axis. Furthermore, a frame arm comprising a part of the forward extension is angulated upwardly to receive the pivoting wheel.

In another embodiment, the garden cart provides both a single front pivoting wheel and two non-pivoting rear wheels that are mounted on a fixed axis. The two rear wheels support the circular frame upon which can rest the receptacle for carrying various articles or objects. The single front pivoting wheel that is mounted on the forward upwardly angulated arm extension of the circular cart frame also supports the frame and is an integral part of the steering mechanism.

In a further embodiment of the present invention, a handle for directing and propelling the garden cart while a use is in a standing position is provided. At the top of the handle is a receptor for the user's hand during operation. Provided at the bottom of the handle is a fork that affixes to a front pivotal wheel yoke. The operating handle and the single front pivotal wheel fixture constitute the steering mechanism and provide mobility to move and direct the cart.

BRIEF DESCRIPTION OF THE DRAWINGS

The structure, operation and advantages of a presently preferred embodiment of this invention will become further apparent upon consideration of the following detailed description taken in conjunction with the accompanying drawings, wherein.

DETAILED DESCRIPTION OF THE PREFERRED EMBODIMENT

To illustrate and provide a more complete and thorough understanding of the present invention, the following detailed description is given concerning the wheeled vehicle and its novel features.

Figure 1:
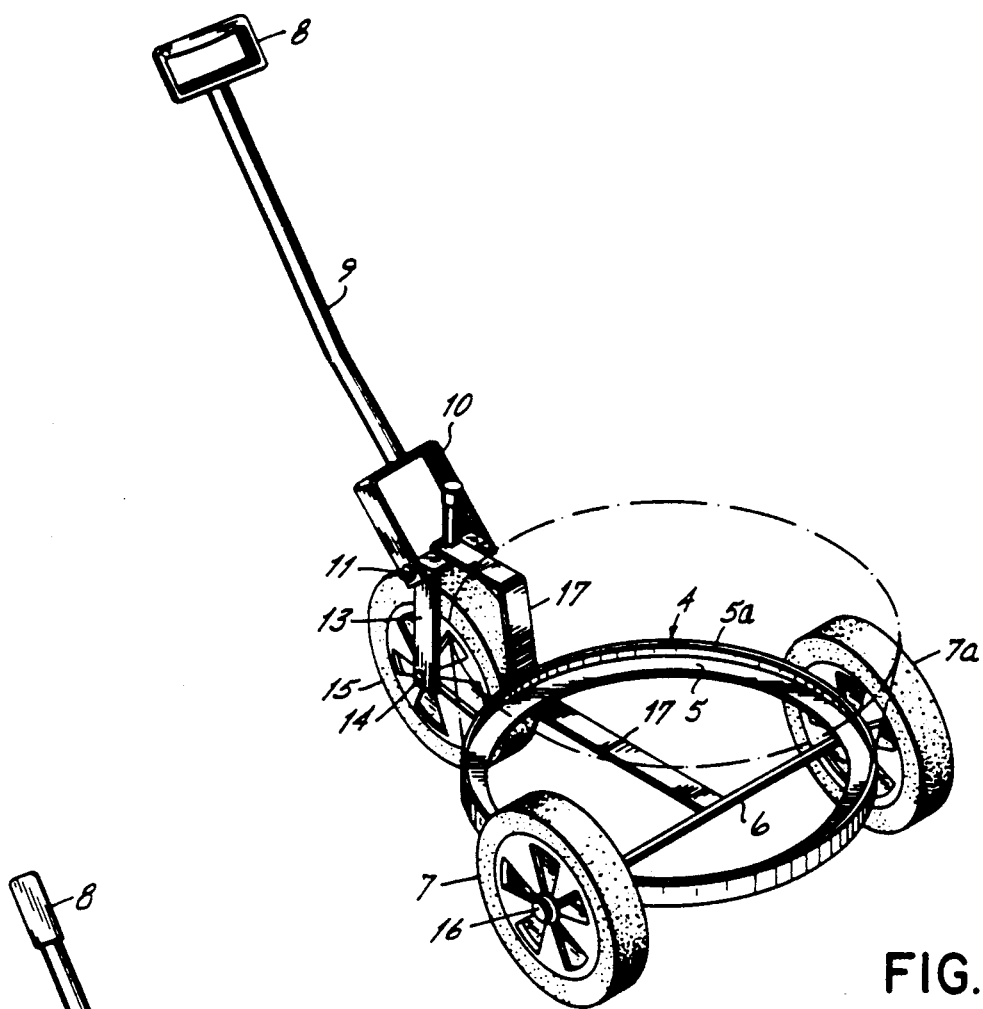
FIG. 1 is a perspective view of the embodiments of the present invention illustrating its use as a garden or lawn cart capable of supporting a receptacle on its low base.

Referring now more particularly to the figures in which like referenced characters indicate like elements throughout, the garden cart in FIG. 1 comprises a circular frame 4 having a base 5 and vertical flange 5a mounted on and supported by an axis 6 and a frame arm 17. Further illustrated in FIG. 1, the circular frame 4 is adapted for receiving and transporting a garden receptacle (shown in phantom line), such as a metal bucket or tub. The receptacle rests on the base 5 and is further retained by flange 5a. The rear portion of the flanged frame 4, which is supported by axle 6 and frame arm 17, rests upon non-pivoting rear wheels 7, 7a that are mounted for rotation about a fixed axle 6 by axle mounting 16. Frame arm 17 is welded to axle 6 for further support of the circular flange frame 5.

Figure 2:
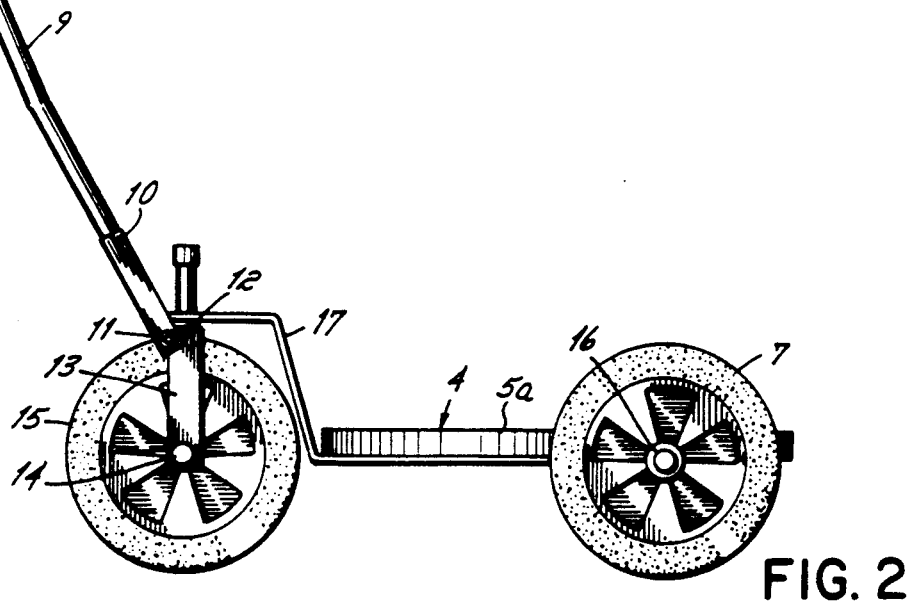
FIG. 2 is a side view of the present invention illustrating in addition to its other embodiments and useful features, the height of the circular frame ring for retaining a receptacle.

Illustrated in FIG. 2, the frame arm 17 is angulated upwardly for receiving a forward single wheel 15. The forward single wheel 15 is journalled to a yoke 13. To allow for rotation on a vertical axis, yoke 13, is pivotally mounted within the bearing 12, bearing 12 connecting frame arm 17 with yoke 13. The upwardly angulated frame arm 17, welded to both circular flanged frame 5 and axis 6, and attached to pivotal yoke 13, connects the rear and front portions of the vehicle.

Referring now more specifically to FIG. 2 of the drawings to illustrate further the features of the front portion of the present invention, upwardly angulated frame arm 17 connects the rear and front portions of the cart. Attached to frame arm 17 by way of bearing 12 is forward single wheel yoke 13. Yoke 13 is mounted on the forward single wheel 15 by way of yoke mounting 14. The handle fork 10 is affixed to the top front area of yoke 13 by way of handle fork mounting 11. Handle fork mounting 11 consists of a pin welded to yoke 13 and pin locking washers. This fixture in addition to the handle 9 with its receptor 8 constitutes the steering mechanism of the forward single wheel and cart.

The mounting 11 of both handle fork 10 and forward single wheel yoke 13 allows for pivotal mobility of the front wheel 15 about a vertical axis. The mounting 11 of handle fork 10 also allows for inward and outward extension of handle 9. This extension provides sufficient movement for directing the cart.

Further illustrated in FIG. 2, handle 9 is angulated rearwardly to the circular frame 5. In addition to inward extension, this feature enables the present invention to be more compact for storage purposes.

While the present invention has been described with reference to a preferred embodiment, it is understood by those skilled in the art that changes and modifications to situations can be made and equivalents substituted to a preferred embodiment without departing from the essential scope of the present invention. It is intended, therefore, that the invention not be limited to a particular embodiment, rather the invention will include all embodiments within the scope of the appended claims.

What is claimed is:

1. A garden or lawn cart for transporting a separable receptacle comprising:
   a frame having circular means for receiving and retaining the receptacle, said frame having a frame member which extends forwardly from said circular means and angulated upwardly and over to receive a front wheel;
   a pair of rear wheels mounted on said frame for rotation;
   a single front wheel mounted on said forwardly extending frame member for pivotal movement about a vertical axis; and
   a handle for controlling the pivotal movement of said single front wheel for moving and directing the movement of said cart, said handle extending outwardly from said frame member and having a sufficient length for gripping by a user while in a standing position for movement of said cart with said rear and front wheels in constant contact with a ground surface during such movement.

2. A cart of claim 1, said circular means having a low base at a level close to the ground for receiving a receptacle for permitting use of the receptacle positioned on said circular means by a user when in a kneeling position.

3. A cart of claim 1 wherein said handle is connected to said single front wheel.

4. A cart of claim 1, said single first wheel being mounted on said frame member by means of a pivoting wheel yoke and said handle being connected on said pivoting wheel yoke by a fork.

5. A cart of claim 1 wherein said front and rear wheels are identical in size.

6. A cart of claim 1 wherein said rear wheels are connected to said frame and said circular means by a rear axle.

7. A cart of claim 1, said circular means comprising a metal ring having a circular base upon which the receptacle rests and a vertical circular flange connected to said circular base in which the receptacle is retained.

8. A garden or lawn cart for transporting a separable receptacle comprising:
   a frame having a circular means for receiving and retaining the receptacle, said circular means being at a level close to the ground for permitting use by a user when in a kneeling position, said frame having a frame member which extends forwardly from said circular means;
   a pair of rear wheels mounted on said frame for rotation;
   a single front wheel mounted on said frame member by a front pivoting wheel yoke for pivotal movement about a vertical axis, said frame member providing a pivot point for said single front wheel and being angulated upwardly and over said single front wheel to receive said single front wheel; and
   a handle extending outwardly from said frame member and being connected to said single front wheel for controlling the pivotal movement of said single first wheel for moving and directing the movement of said cart, said handle being connected to said front pivoting wheel yoke and having a sufficient length extending from said front pivoting wheel yoke for gripping by a user while in a standing position for movement of said cart with said rear and front wheels in constant contact with the ground surface during such movement.

9. A cart of claim 8 said circular means comprising a metal ring having a circular base upon which the receptacle rests and a vertical circular flange connected to said circular base in which the receptacle is retained.

10. A cart of claim 8 wherein said front and rear wheels are identical in size.

11. A cart of claim 8 wherein said rear wheels are connected to said frame and said circular means by a rear axle.

* * * * *